Jan. 5, 1932.   G. O. HODGE   1,839,677
OIL RETAINER CONSTRUCTION
Filed June 6, 1929
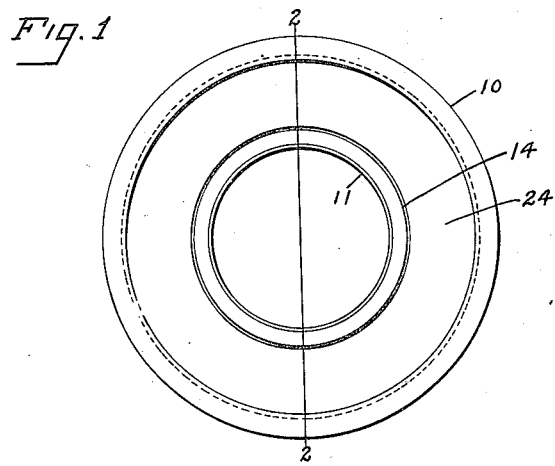
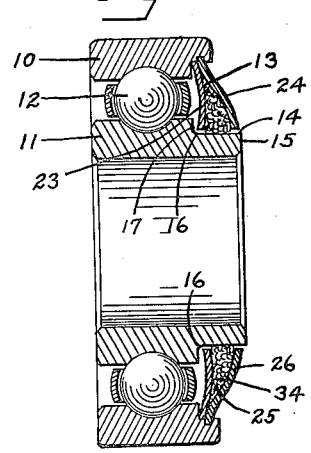
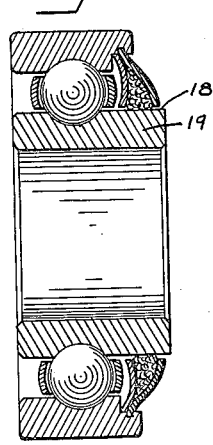
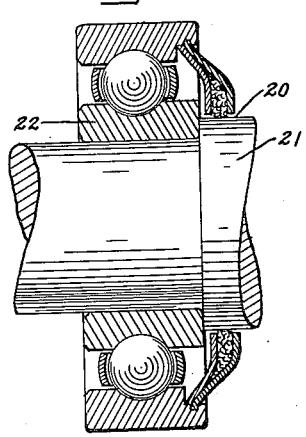
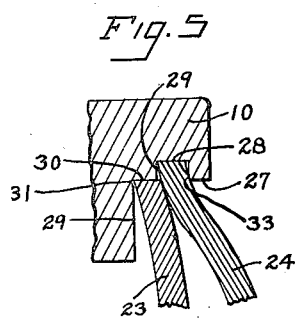
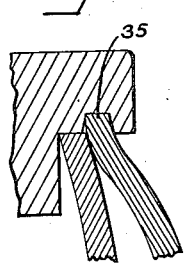
INVENTOR.
George Orvil Hodge
BY Louis M. Schmid
ATTORNEYS.

Patented Jan. 5, 1932

1,839,677

UNITED STATES PATENT OFFICE

GEORGE O. HODGE, OF PLAINVILLE, CONNECTICUT, ASSIGNOR TO STANDARD STEEL AND BEARINGS INCORPORATED, OF PLAINVILLE, CONNECTICUT, A CORPORATION OF DELAWARE

OIL RETAINER CONSTRUCTION

Application filed June 6, 1929. Serial No. 368,871.

My invention relates to improvements in oil retainer construction in ball bearings involving means for retaining oil within the bearing structure generally after the manner and for the purpose disclosed in my application filed September 16, 1924, Serial 737,983, Anti-friction bearing and method of making the same, and the object of my present improvement is to produce an oil retainer construction that provides means for making the oil retention substantially positive by the use of opposed contacting and rubbing faces of the two relatively moving parts in lieu of a narrow gap or space as in the structure previously described, and involving the use of felt or the like for bridging the gap between the metallic supporting means on one of the bearing rings and the cylindrical face on the other ring or on a shaft or the like and thus completing the enclosure for the oil.

In the accompanying drawings:—

Figure 1 is an end face view of a ball bearing in which is incorporated oil retainer construction embodying my invention.

Figure 2 is a sectional view on the line 2—2 of Fig. 1.

Figure 3 is a similar view showing a different form for the inner ring of the ball bearing.

Figure 4 is a similar view showing a structure in which the felt is opposed directly to a shaft in lieu of the inner ring of the bearing.

Figure 5 is an enlarged fragmentary view showing the details of the peripheral structure of the annular holding plates and the cooperating grooves and recesses.

Figure 6 is a similar view showing a generally V-shaped groove or slot for the outside plate.

My improved oil retainer construction is applied to a ball bearing having an outer ring 10 and an inner ring 11 and balls 12 therebetween and comprises an oil retainer structure 13 that, as shown, is supported by the outer ring 10 and operates as a fixed part thereof, being connected with said outer ring 10 in a manner such as to effect an oil seal, the manner of doing this involving means similar to the means shown and described in the patent application mentioned above, so far as the detail of the oil seal is concerned.

The oil retainer structure 13 projects inwardly radially from the outer ring 10 and is opposed to a cylindrical relatively rotating surface or face; comprises a metallic supporting part that terminates in close relationship to said surface or face, being separated therefrom by a narrow gap; and bridging said gap is an oil-stop or dam structure of felt that makes rubbing contact with the surface or face.

In the structure that is shown in Figs. 1 and 2 the rotating contact surface or face or seat 14 is part of the inner ring 11; extends longitudinally inwardly from the end face 15; merges at the inner end with a corner 16; and said corner 16 merges with a short radial shoulder-like face 17.

In the structure of Fig. 3 the seat 18 is part of the inner ring 19 and is of plain cylindrical form, without any shoulder.

In the structure of Fig. 4 the seat 20 is provided by the supporting shaft 21, and the inner ring 22 terminating adjacent said seat 20.

It is important to note that the seats 14, 18, and 20 are each and all finished accurately to the cylindrical form by grinding for the purpose of ensuring the oil-tightness of the contact joint and to enhance the life of the oil seal.

A description of the oil retainer structure 13 of Figs. 1 and 2 will answer for the others.

The metallic supporting structure of the oil retainer 13 is composed of an inner plate 23 and outer plate 24, both of which plates are of annular form and engage by their peripheries with the outer ring 10, the said peripheries being in close association and preferably in forceful contact relation as will be described. Extending inwardly towards the axis from said peripheries the plates 23 and 24 diverge so as to provide a generally tri-angular-cross-sectioned housing space 25 in which is located the dam or wiper 26 of felt or the like.

The plate peripheries are seated in an enlarged recessed and slotted end of the bore of the outer ring 10 comprising a short cylindrical face 27 that is interrupted by a radial slot or channel 28 and that terminates against a radial shoulder 29. The diminutive part 30 of the cylindrical face 27 between the slot 28 and the shoulder 29 and the corner 31 that is composed of these elements serve as a combined seat and backing for the periphery 32 of the inner plate 23 and said diminutive part 30 is shorter than the thickness of the said peripheral part 32 of the inner plate 23. Thus the relation of the dimensions of the parts is such that the material of the inner plate when seated against the corner 31 overhangs to a slight though appreciable extent the slot 28. This overhanging condition may be reduced to some extent by the assembling operation but is maintained to some extent in the completed structure so that the two plates have resilient engagement such as to tend to reduce the triangular housing space or chamber 25 for the wiper 26 and thus tend to push the felt inwardly against the opposed contact seat.

The peripheral edge portion 33 of the outer plate 24 is forced into the slot 28 after the manner of the oil retainer shown and described in the application above referred to, the only difference being in the detail that in the present instance there is forcible contact with the material of the inner plate 23 as has been described.

The inner plate 23 is shaped to provide a rounded form for the cross section for reinforcement effect and the plate is positioned so that the middle portion 34 bulges outwardly towards the outer plate 24 so that the peripheral portions 32 and 33 are in close association and generally in contact, face to face, so that the wiper chamber is for most parts confined to the separating space that is more closely adjacent the cylindrical seat 14.

The inner plate 23 is made to fit nicely and snugly within the seat structure that is provide therefor, without any forcing being needed to place the same in position previous to being forcibly engaged by the outer plate 24 during the final assembling operation.

The slot 28 may be formed with parallel radial side walls or may be formed by means of convergent walls as in the case of the slot 35 that is shown in Fig. 6.

I claim as my invention:—

1. In oil retainer construction for ball bearings, an outer ring member, an inner rotative member composed of a shaft and an inner ring mounted thereon, balls between said ring structures, annular plate devices supported by said outer ring member, projected towards said rotative member, and with portions adjacent separated one from the other to provide a housing space and separated from said rotative member by a gap, and a wiper structure of felt or the like filling said space and bridging said gap so as to make contact with said rotative member, said plate devices comprising an inner plate and an outer plate that have their peripheral portions opposed in face to face relation, and said inner plate being rounded in cross section so as to bring its peripheral portion into close association with the opposed portion of the outer plate.

2. In oil retainer construction, outer and inner rings and balls therebetween, an oil retainer structure composed of annular inner and outer plates projected from the outer ring towards the inner ring and a wiper therebetween that is confined to the portions that are adjacent said inner ring, said outer ring being provided with a shoulder against which the peripheral edge portion of said inner plate is seated and being provided with a radial groove that is spaced from said shoulder by slightly less than the thickness of said peripheral edge portion, and the peripheral edge portion of said outer ring being forced into said groove with the portion that is opposed to said peripheral edge portion on the inner plate making forceful contact therewith.

3. In oil retainer construction, an outer ring and an inner rotating member separated by balls, a pair of annular plate-members supported by their edges from said outer ring and projected in divergent relation from said outer ring towards said rotating member, a wiper clamped in the space between said plate-members and making sealing contact with said rotating member, whereby the pressure effect of said plate-members tends to urge said wiper towards said rotating member so as to improve the sealing contact.

GEORGE ORVILLE HODGE.